(12) United States Patent
Perets et al.

(10) Patent No.: US 7,574,214 B2
(45) Date of Patent: Aug. 11, 2009

(54) DEVICE, SYSTEM AND METHOD OF MULTIPLE ACCESS TRANSMISSION

(75) Inventors: Yona Perets, Ra'anana (IL); Daniel Yellin, Ra'anana (IL); Doron Rainish, Ramat Gan (IL); Ronen Mayrench, Ra'anana (IL); Yakir Ovadia, Kfar Yona (IL)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 11/136,476

(22) Filed: May 25, 2005

(65) Prior Publication Data

US 2006/0270416 A1 Nov. 30, 2006

(51) Int. Cl.
*H04Q 7/20* (2006.01)
*H04B 17/00* (2006.01)

(52) U.S. Cl. .................. 455/450; 455/451; 455/452.1; 455/454; 455/67.11

(58) Field of Classification Search ................. 455/450, 455/452.1, 452.2, 453, 515, 513, 451, 67.11
See application file for complete search history.

(56) References Cited

U.S. PATENT DOCUMENTS

| | | | | |
|---|---|---|---|---|
| 7,228,148 B2* | 6/2007 | Esteves et al. | ............... | 455/522 |
| 7,313,126 B2* | 12/2007 | Yun et al. | .................. | 370/344 |
| 7,317,702 B2* | 1/2008 | Dominique et al. | .......... | 370/328 |
| 7,328,019 B2* | 2/2008 | Nishikawa et al. | ........... | 455/436 |
| 7,437,166 B2* | 10/2008 | Osseiran et al. | .......... | 455/452.1 |
| 7,457,588 B2* | 11/2008 | Love et al. | ............... | 455/67.11 |
| 2004/0203476 A1* | 10/2004 | Liu | .............................. | 455/69 |
| 2004/0224697 A1* | 11/2004 | Hakkinen et al. | ............ | 455/450 |
| 2005/0249127 A1* | 11/2005 | Huo et al. | .................... | 370/252 |
| 2006/0023650 A1* | 2/2006 | Dominique et al. | ......... | 370/310 |
| 2007/0293233 A1* | 12/2007 | Inoue et al. | .................. | 455/450 |

OTHER PUBLICATIONS

Das S et al. Institute of Electrical and Electronics Engineers: "An Efficient Sub-Carrier and Rate Allocation Scheme for M-QAM Modulated Uplink OFDMA Transmission" Conference Record of The 37$^{th}$. Asilomar Conference on Signals, System, & Computers. vol. 1 of 2, Conf. 37. pp. 136-140. 2003.

International Search Report for PCT/US2006/020822 mailed Sep. 21, 2006.

Keunyoung Kim et al: Iterative and Greedy Resource Allocation in an Uplink OFDMA System Personal, Indoor and Mobile Radio Communications, 2004. IEEE vol. 4, pp. 2377-2381.

(Continued)

*Primary Examiner*—Tilahun Gesesse
(74) *Attorney, Agent, or Firm*—Shiloh Buchek PLLC

(57) ABSTRACT

Briefly, some embodiments of the invention provide devices, systems and methods of wireless multiple access transmission. For example, a method in accordance with an embodiment of the invention may include estimating channel quality values of a set of pilot signals received at different, respective, frequency slots of an uplink channel; and allocating an uplink frequency band for the uplink channel based on the estimated channel quality values.

26 Claims, 4 Drawing Sheets

OTHER PUBLICATIONS

Sternad M., Aronsson D., "Channel Estimation and Prediction for Adaptive FDM Downlinks OFDMA/TDMA Uplinks, Based on Overlapping Pilots" Acoustics, Speech, and Signal processing, 2005. International Conference on Philadelphia, Pennsylvania, USA, Mar. 2005.

Toufik I et al: "Channel Allocation Allgorithms for Multi-Carrier System" Vehicular Technology Conference, 2004, pp. 1129-1133.

Rapporteur, "Agreed Text Proposals for the Requirement TR", RP050155, RAN meeting #27, Tokyo, Japan Mar. 9-11, 2005.

The IEEE 802.16 Working Group on Broadband Wireless Access Standards. http://ieee802.org/16/.

R1-050266, "Proposal for the uplink multiple access scheme for E-UTRA", Nortel, 3GPP TSG RAN WG1#40bis, Beijing, China, Apr. 4-8, 2005.

R1-050251, "Uplink Considerations for UTRAN LTE", Nokia, 3GPP TSG RAN WG1#40bis, Beijing, China, Apr. 4-8, 2005.

C. Garnier et al., "Performance of an OFDM-SDMA based System in a Time-Varying Multi-Path Channel", IEEE, 2001, pp. 1686-1690.

* cited by examiner

DEVICE, SYSTEM AND METHOD OF MULTIPLE ACCESS TRANSMISSION

BACKGROUND OF THE INVENTION

In some wireless communication systems, for example, Code Division Multiple Access (CDMA) systems and Wideband CDMA (WCDMA) systems, multiple wireless communication devices may share an access medium. For example, time and/or frequency resources may be shared among multiple devices, e.g., utilizing Orthogonal Frequency-Division Multiplexing (OFDM), Some wireless communication standards and protocols, for example, Radio Access Network (RAN) long-term evolution requirements, may require that a wireless communication system support certain data transfer rates, e.g., per unit of frequency bandwidth, for example, a downlink peak data rate of 5 bits per second per Hertz (b/s/Hz) and an uplink peak data rate of 2.5 b/s/Hz.

Unfortunately, conventional division of time and/or frequency resources may be inefficient, e.g., may not achieve the required data transfer rates.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
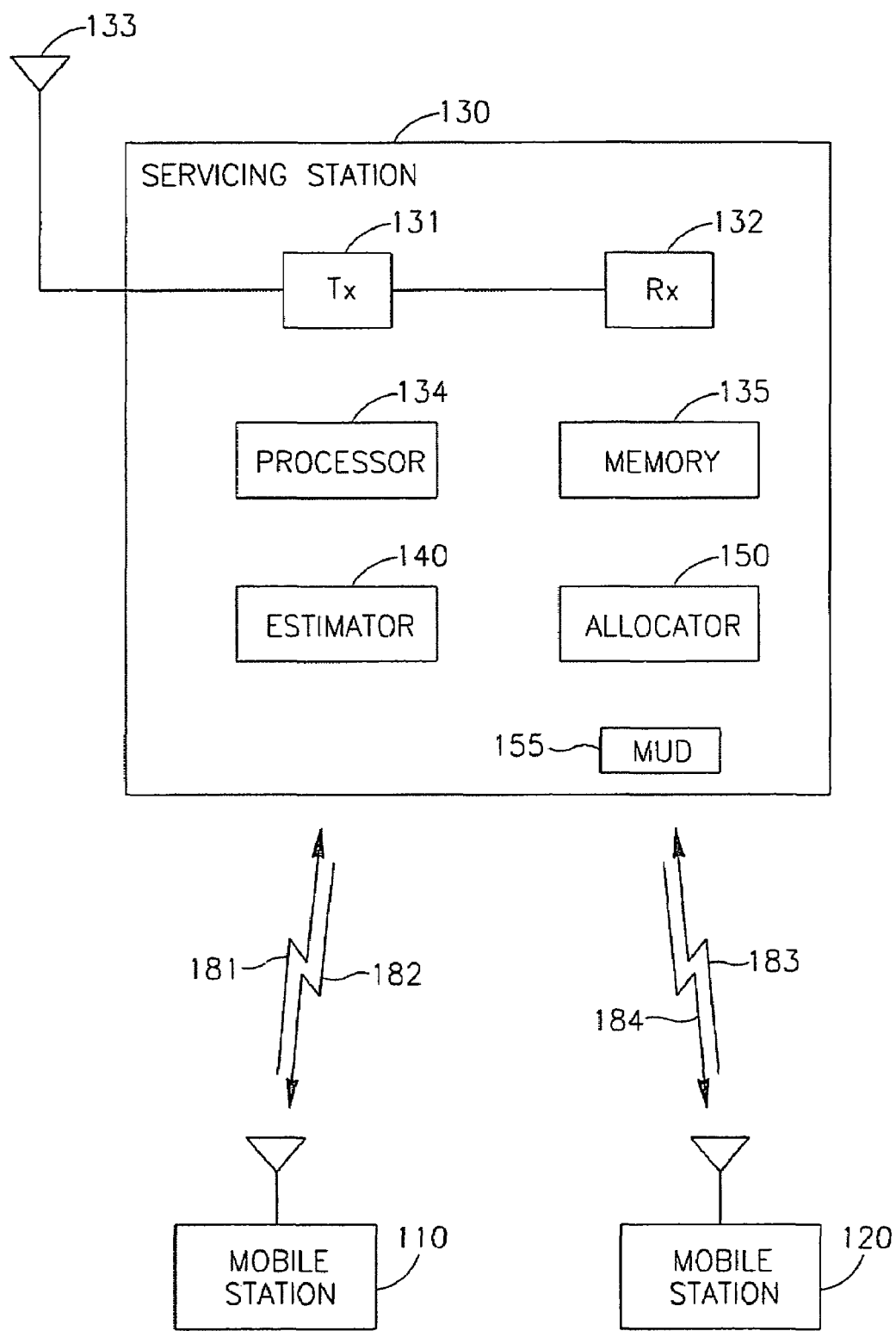
FIG. 1 is a schematic block diagram illustration of a wireless communication system able to allocate frequency bands in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a Local Area Network (LAN), a Wireless LAN (WLAN), devices and/or networks operating in accordance with existing IEEE 802.11, 802.11a, 802.11b, 802.11e, 802.11g, 802.11i, 802.11n, 802.16 standards and/or future versions of the above standards, a Wi-Fi device or system, a Wi-Fi network, a WiMAX device or system, a WiMAX network, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, or the like. It is noted that embodiments of the invention may be used in various other apparatuses, devices, systems and/or networks.

The term "frequency bin" as used herein may indicate a unit of frequency range. It may include, for example, a range of 10 KHz, a range between 3.50 and 3.51 MHz, or the like. Other suitable values or ranges may be used.

The terms "frequency cluster", "bins cluster" or "bin group" as used herein may include, for example, a group of frequency bins. For example, a frequency bin may include a frequency range of 10 KHz; a frequency cluster may include a group of, for example, four consecutive bins and thus may include a range of, for example, 3.03 to 3.07 MHz; and another frequency cluster may include a group of, for example, five non-consecutive bins and thus may include, for example, a first range of 3.02 to 3.04 MHz and 4.04 to 4.07 MHz. Other suitable ranges, consecutive bins, non-consecutive bins, and/or values may be used.

The term "frequency slot" as used herein may include, for example, a specific frequency, a group of specific frequencies, a frequency band, a frequency bin, a frequency cluster, a bin cluster, a bin group, or other portion of the spectrum.

FIG. 1 schematically illustrates a block diagram of a wireless communication system 100 able to allocate frequency bands in accordance with an embodiment of the invention. System 100 may include and/or may be, for example, a first generation cellular system, a second generation cellular system, a third generation cellular system, a fourth generation cellular system, a wireless LAN system, a wireless metropolitan area system, a WiMAX system, or the like.

System 100 may include, for example, one or more wireless communication stations, e.g., mobile stations 110 and 120, and one or more servicing stations, e.g., a servicing station 130.

Mobile stations 110 and/or 120 may include, for example, a wireless communication station, a wireless communication device, a portable or mobile communication device, a cellular phone, a mobile phone, a mobile computing platform, a laptop computer, a notebook computer, a PDA device, or the like.

Servicing station 130 may include, for example, a transmitter 131, a receiver 132, an antenna 133, a processor 134, and a memory unit 135. Servicing station 130 may further include other suitable hardware components and/or software components.

Transmitter 131 may include, for example, a Radio Frequency (RF) transmitter able to transmit RF signals. Receiver 132 may include, for example, a RF receiver able to receive RF signals. In some embodiments, transmitter 131 and receiver 132 may be implemented as a transceiver, a transmitter-receiver, a wireless modem, or one or more units able to perform separate or integrated functions of sending and/or receiving wireless communication signals, blocks, frames, data items, transmission streams, packets, messages and/or data.

Antenna 133 may include, for example, an internal and/or external RF antenna. In some embodiments, for example, antenna 133 may include a dipole antenna, a monopole antenna, an omni-directional antenna, an end fed antenna, a circularly polarized antenna, a micro-strip antenna, a diversity antenna, or any other type of antenna suitable for sending and/or receiving wireless communication signals, blocks, frames, data items, transmission streams, packets, messages and/or data.

Processor 134 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Memory unit 135 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Servicing station 130 may communicate with mobile stations 110 and/or 120 using one or more wireless communication links, e.g., links 181-184. For example, servicing station 130 may transfer data to mobile stations 110 and 120 using downlinks 182 and 184, respectively; and servicing station 130 may receive data from mobile stations 110 and 120 using uplinks 181 and 183, respectively.

In some embodiments, links 181-184 may include one or more sub-channels, which may be used, for example, for voice and/or data and/or control transfer. Optionally, the sub-channels may include one or more sub-carriers to carry signals, for example, pilot signals, coded signals, encoded signals, data signals, control signals, or the like. In some embodiments, the sub-carriers may carry symbols In some embodiments, servicing station 130 may further include an estimator 140 and/or an allocator 150, which may be implemented as, for example, controllers or sub-units of servicing station 130, software or hardware components of servicing station 130, sub-units of processor 134, sub-units of transmitter 131 and/or receiver 132. Estimator 140 and/or allocator 150 may be operatively associated with other components of servicing station 130, for example, transmitter 131, receiver 132, antenna 133, processor 134, and/or memory unit 135.

Estimator 140 may estimate channel frequency response over multiple frequency slots, e.g., over the entire frequency bandwidth available for the servicing station 130. For example, estimator 140 may estimate Channel Quality Values (CQVs) of the channels over the entire frequency bandwidth that can be used by mobile stations 110 and/or 120, and/or by servicing station 130. Based on the estimated CQVs, allocator 150 may allocate to mobile station 110 and/or 120 a frequency band or cluster for uplink transmission, for example, a specific frequency, a range of frequencies (e.g., a "frequency bin" having a predetermined frequency range, for example, approximately 10 KHz), or a group of frequency bins (e.g., a "bin group" or a "bin cluster" having multiple frequency bins).

In some embodiments, the servicing station 130 may have information representing the entire frequency channel response (e.g., represented as a frequency channel response plot or chart, or frequency channel response values) of substantially all mobile stations, or multiple mobile stations, or a group of mobile stations. Accordingly, the servicing station 130 may dynamically allocate frequency resources, for example, one or more frequency bins, one ore more frequency clusters around a specified frequency bin location, or several frequency bin locations in the available frequency spectrum. The servicing station 130 may (e.g., optimally) allocate frequency resources to all of the users (e.g., the mobile stations). In one embodiment, the servicing station 130 may determine at which frequency bin(s) the mobile station 110 may transmit, and/or may determine and allocate to mobile station 110 the number and identity of specific frequency bin(s) available to mobile station 110.

In some embodiments, feedback from the servicing station 130 to the mobile station 110 may be efficient, e.g., may have low overhead on the downlink transmission. In a frequency cluster based system, the servicing station 130 may send to the mobile station 110, for example, on a control channel of the mobile station 10, an indication (e.g., a number or a description) of a frequency cluster which the mobile station may use in a subsequent transmission. For example, the frequency spectrum may be divided into 16 clusters, and the overhead may include four information bits once the servicing station 130 determines to set or modify frequency resource allocation, e.g., to represent a newly-allocated frequency cluster, or a modified identifier of an allocated frequency cluster.

In one embodiment, feedback information transmitted in the downlink may be encrypted, encoded, signed, secured or protected, e.g., using a code, for example, to allow error detection and/or error correction. Various suitable operations may be used to cure or correct a detected error. For example, in one embodiment, the mobile station 110 may be allowed to use or re-use time/frequency slots which were allocated or used in a previous (e.g., most recent) time/frequency allocation. In another embodiment, the mobile station 110 may not be allowed to transmit until a valid time-frequency allocation is correctly received from the servicing station 130. In yet another embodiment, system 100 or servicing station 130 may specify or define unused frequency cluster(s) or unused frequency bin(s) in different time slots, to allow mobile stations having unspecified resource allocation to transmit in such unused time-frequency slots, or in "default" time-frequency slots which may be non-reserved or non-allocated to specific mobile stations. In still another embodiment, mobile station 110 may be allowed to transmit data using a hopping strategy, e.g., such that the uplink time-frequency resource allocation may be based on random or pseudo-random sequence. In some embodiments, various combinations of one or more of the above-mentioned methods may be used.

In some embodiments, the mobile stations 110 and/or 120 may optionally transmit information (e.g., non-pilot data) in frequency bin(s) allocated for pilot signals; for example, stations 110 and/or 120 may send data information using frequency bins outside a main band allocated for data signals. In one embodiment, the transmitted information may have a substantially constant envelope, for example, the pilot signals may have a substantially constant amplitude, and only the phase may carry data or control information. In one embodiment, the servicing station 130 may estimate channel frequency response values, for example, for CQV calculation, using the known amplitude of the pilot signals. This estimation may be further used in the resource allocation stage; for example, in one embodiment, channel estimation may be based on absolute frequency response values associated with the received pilot signals. The transmitted data or control information may be coded using differential encoding, e.g., Differential Phase-Shift Keying (DPSK) or other suitable type of encoding, or using other techniques that may not require phase estimation to determine channel frequency response values.

In some embodiments, the servicing station 130 or the system 100 may use the frequency allocation method described herein with one or more, but not necessarily all, of the mobile stations of system 100. In one embodiment, the servicing station 130 may determine to which mobiles stations it may be efficient or beneficial to allocate frequency bins or frequency clusters, and/or which mobile stations may not be served in accordance with a certain frequency allocation method. For example, the servicing station 130 may determine that high mobility users may not be served using the resource allocation scheme described herein.

In some embodiments, the servicing station 130 may track channel frequency estimates of one or more mobile stations, e.g., mobile station 110. The servicing station 130 may compare a frequency allocation of mobile station 110 to actual usage of the allocated frequencies by the mobile station 110, e.g., taking into account possible delays. This may allow servicing station 130, for example, to detect or determine the efficiency, accuracy or correctness of past allocations or past estimates of CQVs, or to evaluate or analyze other properties of past transmissions of one or more mobile stations. For example, a mobile station for which the CQVs do not correctly predict efficient frequency band allocation (e.g., a "fast" mobile station), may be served differently by the servicing station 130, thereby reducing pilot signals overhead transmission. In one embodiment, for example, a fast mobile station may use constant frequency allocation; in another embodiment, a fast mobile station may use random or pseudo-random frequency resource allocation. In some embodiments, servicing station 130 may detect one or more mobile stations which may be adapted to operate in accordance with a predefined frequency allocation scheme, and may serve such mobile station(s) accordingly.

In some embodiments, a possible contention between mobile stations may be handled, avoided, denied or rejected, e.g., by allocator 150, for example, in accordance with one or more predefined contention avoidance schemes, to avoid a scenario where identical or overlapping frequency bins or frequency clusters are allocated to multiple mobile stations. Various suitable methods of frequency allocation or resources allocation may be used to avoid a possible contention; for example, in one embodiment, allocator 150 may allocate to mobile station 110 the frequency bin associated with the highest CQV or the highest SNR value, and may then selectively allocate to mobile station 120 another frequency bin associated with the highest CQV or the highest SNR value which is available and not already allocated to mobile station 110.

In some embodiments, for example, mobile stations 110 and 120 may transmit a pilot signal carrying a pre-defined data sequence, e.g., using the uplinks 181 and 183, respectively Mobile stations 110 and 120 may transmit the pilot signal over the entire frequency bandwidth available to substantially all mobile stations. For example, if the available frequency bandwidth ranges from 1 MHz to 4 MHz, then mobile station 110 and 120 may transmit the pilot signals (e.g., a set or series of pilot signals) at predefined frequency bins within that range, e.g., approximately 1 MHz, 1.5 MHz, 2 Mhz, 2.5 MHz, 3 MHz, 3.5 MHz, 4 Mhz, or the like.

In one embodiment, for example, mobile station 110 may transmit data at a certain frequency (e.g., 2.5 MHz), and may periodically transmit a set of pilot signals that may be split or spread over the entire frequency bandwidth, e.g., for a time period of approximately 2 milliseconds.

Servicing station 130 may receive the set of pilot signals transmitted over multiple frequency slots and, based on the received set of pilot signals, estimator 140 may estimate the frequency response of mobile stations 110 and/or 120, over the entire available frequency bandwidth.

In some embodiments, for example, estimator 140 may estimate CQVs associated with different mobile stations and representing the entire frequency channel response of different mobile stations. The CQVs may include, for example, a Signal to Noise Ratio (SNR) value, a Signal to Interference Ratio (SIR) value, a Carrier to Interference Ratio (CIR) value, or the like. In one embodiment, for example, the CQVs may be a function of path loss, e.g., a ratio between a power level of the transmitted signal at the mobile station and a power level of a received signal at servicing station 130. CQV estimation may include calculation or determination of other suitable parameters. Optionally, the CQVs may be estimated by estimator 140 utilizing processor 134 for processing operations, and may be stored in memory unit 135. The estimated CQVs, or data representing the estimated CQVs, may indicate the channel frequency response.

Based on the estimated CQVs, allocator 150 may allocate to mobile station 110 a first frequency, frequency range, frequency bin, or bin cluster for uplink transmission, and may allocate to mobile station 120 a second (e.g., different) frequency, frequency range, frequency bin, or bin cluster for uplink transmission. The allocation may utilize one or more algorithms, for example, to increase or maximize the total uplink throughput of mobile stations 110 and 120, to increase or maximize the total uplink throughput of a certain station (e.g., station 110), to increase or maximize the total uplink throughput of a group of stations, or the like.

For example, in one embodiment, allocator 150 may allocate to mobile station 110 a frequency, frequency bin, or bin cluster associated with the highest CQV estimated for the multiple frequency slots over which mobile station 110 transmitted the set of pilot signals. For example, if the CQV (e.g., the SNR value) estimated for mobile station 110 at a frequency of 3.5 MHz is higher than the CQV of mobile station 110 at all other frequencies, then allocator 150 may allocate to mobile station 110 the frequency of 3.5 MHz, or a frequency bin including that frequency (e.g., a frequency bin of 3.45-3.46 MHz), or a bin cluster including a frequency bin that covers this frequency (e.g., a five-bin cluster of 3.25-3.30 MHz).

In some embodiments, an indication of the frequency, frequency bin, or bin cluster allocated by allocator 150 to mobile station 110, may be transmitted by servicing station 130 to mobile station 110. The mobile station 110 may receive the indication, and may transfer data over the uplink 181 using the allocated frequency, frequency bin, or bin cluster, respectively.

In some embodiments, servicing station 130 may store (e.g., in memory unit 135) data representing allocation of frequencies, frequency bins, or bin clusters by allocator 150 to one or more mobile stations. The stored frequency allocation data may be used by allocator 150 for further allocations of frequencies, frequency bins, or bin clusters to other mobile stations. For example, servicing station 130 may store data representing the allocation of the 3.5 MHz frequency to mobile station 110, as in the above example, and may not allocate this frequency to mobile station 120. In one embodiment, for example, allocator 150 may selectively allocate a frequency, a frequency bin or a bin cluster to a mobile station, only if that frequency, frequency bin or frequency is available and not already allocated to another mobile station (e.g., at all, or within a pre-defined time period)

In some embodiments, optionally, the servicing station 130 may periodically allocate or re-allocate frequencies, frequency bins, or bin clusters to mobile stations 110 and/or 120, for example, at pre-defined time intervals, e.g., at approximately 10 millisecond intervals.

In some embodiments, optionally, the servicing station 130 may take into account, for example, in the estimation operations of estimator 140 and/or the allocation operations of allocator 150, other suitable data or parameters, e.g., data associated with downlink transmissions. Furthermore, although portions of the discussion herein may describe estimation operations and/or allocation operations performed by the servicing station, these operations may be performed by mobile stations 110 and/or 120. For example, in some embodiments, system 100 may use Time Division Duplexing (TDD) to allow multiple access to mobile stations using time division between uplink signals and downlink signals utilizing the same frequency band. In one embodiment, for example, system 100 may operate based on an assumption that an uplink channel frequency response of mobile station 110 may be similar or substantially identical to a downlink channel frequency response of mobile station 110. In such case, the mobile station 110 may estimate the channel frequency response over the entire frequency band, and may transmit to servicing station 130 indications of preferred frequency bands. This may allow, for example, eliminating the need to transmit pilot signals at frequency clusters that are covered by the receive signal (e.g., downlink transmission), and/or may increase or maximize the network throughput.

In some embodiments, the servicing station 130 may include more than one antenna (e.g., more than one receive antenna), and the mobile station 110 and/or 120 may include more than one antenna (e.g., more than one transmit antenna). In one embodiment, the servicing station 130, the mobile station 110 and/or the mobile station 120 may include one or more antennas, multiple receive antennas and/or multiple transmit antennas. In such cases, the mobile station 110 and/or 120 may transmit a set of pilot signals, such that the servicing station 130 may estimate the overall channel frequency response of all available links. For example, in one embodiment, mobile station 110 may transmit a set of pilot signals on two uplink channels of link 181, and mobile station 120 may transmit pilot signals on two uplink channels of link 183. The servicing station 130 may use two receive antennas 133 to estimate all available channels between the four transmit antennas (e.g., two transmit antennas of mobile station 110 and two transmit antennas of mobile station 120) and two receive antennas of servicing station 130. The allocator 150 may use this information to more efficiently utilize network resources, for example, to assign time and frequency resources per mobile station antenna.

Figure 2:
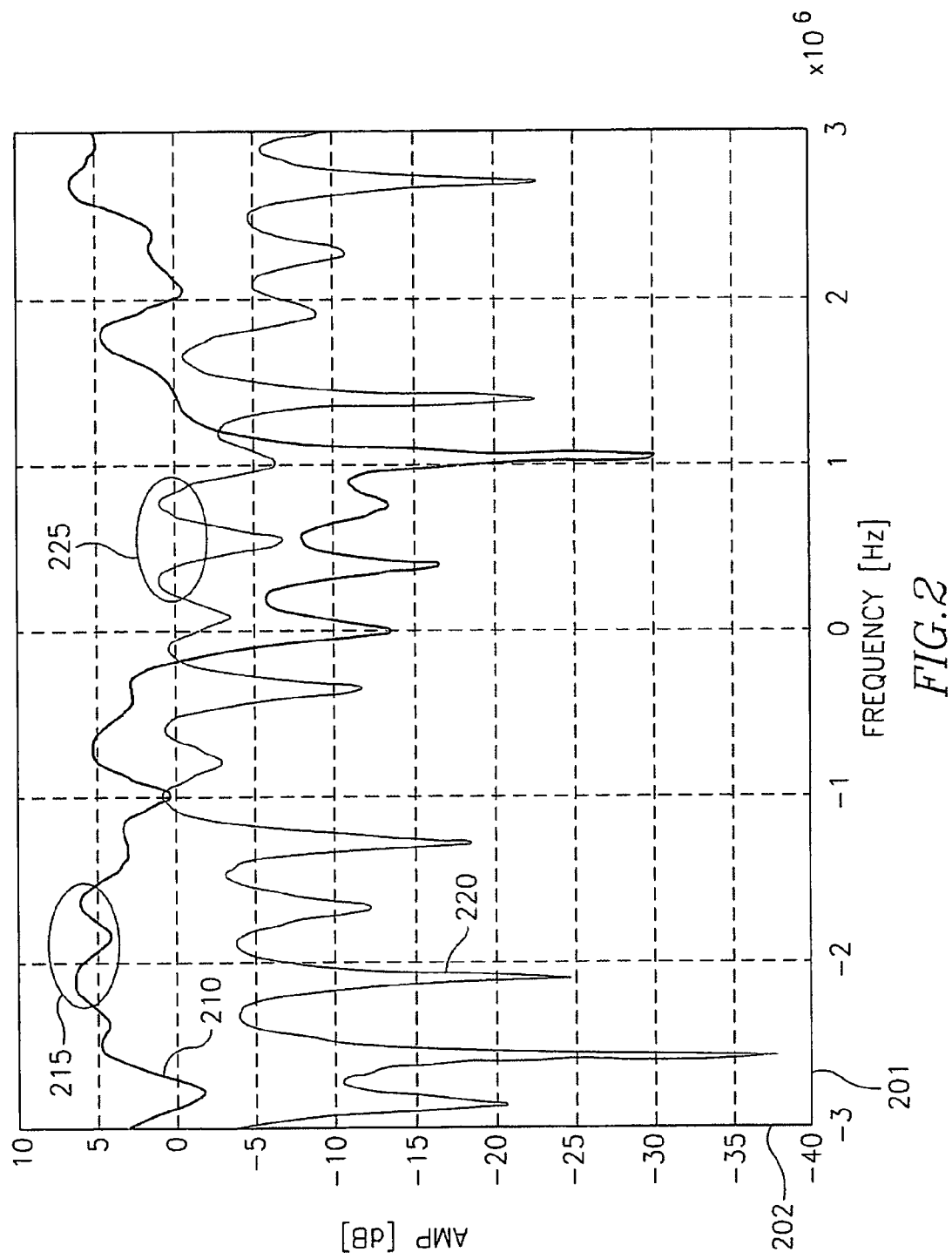
FIG. 2 is a schematic illustration of a channel frequency response plot in accordance with an embodiment of the invention.

Reference is made to FIG. 2, which schematically illustrates a channel frequency response plot in accordance with an embodiment of the invention. A horizontal axis 201 may indicate frequency values, e.g., in Hz, and a vertical axis 202 may indicate channel response, e.g., estimated CQVs, estimated SNR values, or estimated signal strength (e.g., in dB). Graphs 210 and 220 may indicated channel response as a function of frequency, e.g., of mobile stations 110 and 120 of FIG. 1, respectively. In some embodiments, for example, the values of graphs 210 and 220 of FIG. 2 may be estimated by estimator 140 of FIG. 1, e.g., based on the set of pilot signals that mobile stations 110 and 120 transmit and are split or spread over the entire available frequency of the spectrum.

As shown in FIG. 2, a portion 215 of graph 210 includes the highest response values of graph 210. Accordingly, a frequency, a frequency bin, or a bin cluster, associated with portion 215, may be allocated to the mobile station 110 associated with graph 210. For example, if a single frequency bin has frequency bandwidth of 10 KHz, then the mobile station 110 may receive frequency allocation at approximately −2.1 MHz, e.g., a single frequency bin in the range of −2.01 MHz to −2.00 MHz, or a six-bin cluster between −2.01 MHz to −1.95 MHz, may be allocated to the mobile station 110 for uplink transmissions.

Similarly, for example, a portion 225 of graph 220 includes the highest response values of graph 220. Accordingly, a frequency, a frequency bin, or a bin cluster, associated with portion 225, may be allocated to the mobile station 120 associated with graph 220. For example, a frequency allocation at approximately 0.35 MHz, a single frequency bin between 0.30 MHz to 0.31 MHz, or a six-bin cluster between 0.30 MHz to 0.36 MHz, may be allocated to the mobile station 120 for uplink transmissions.

Figure 3:
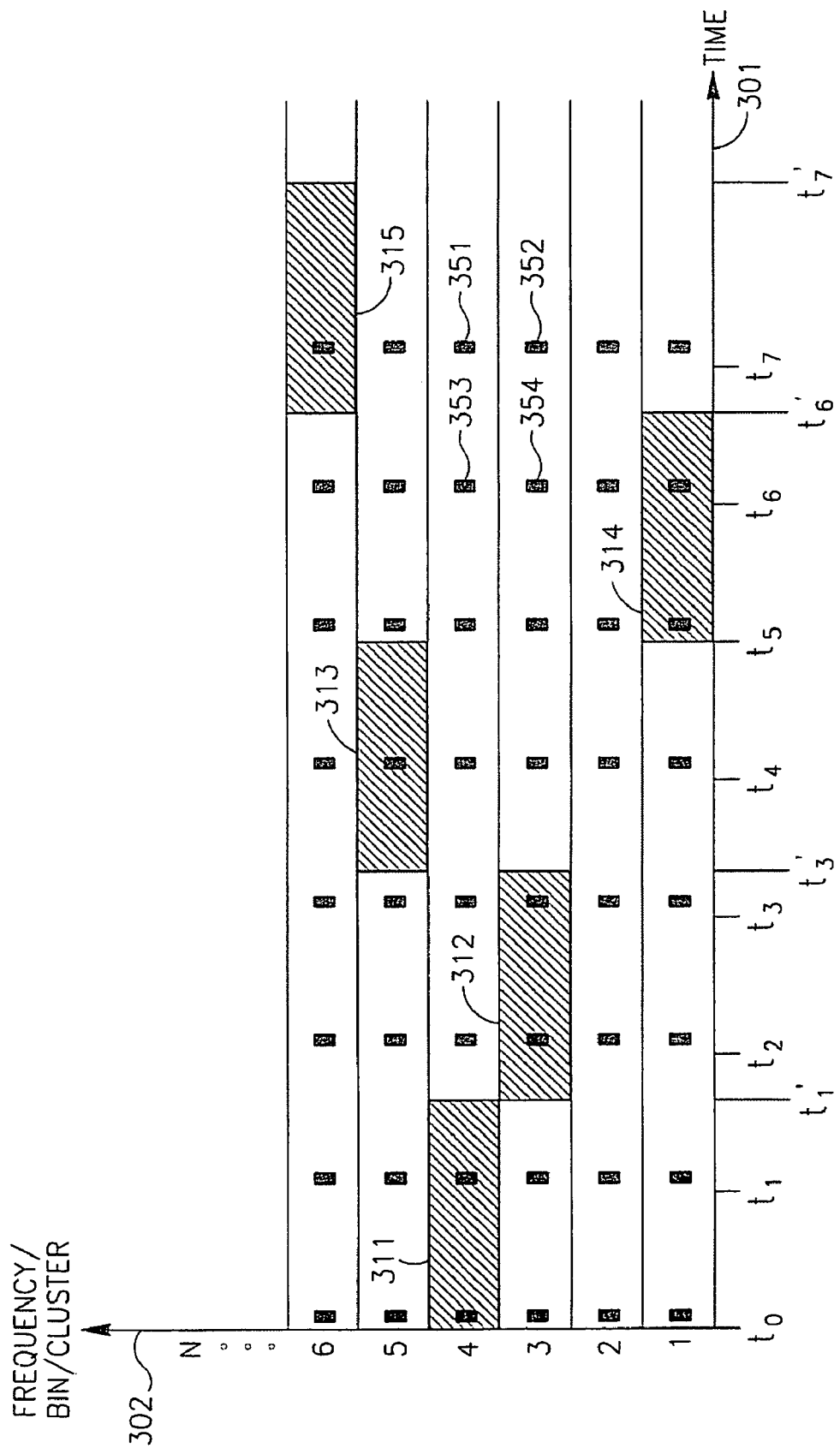
FIG. 3 is a schematic illustration of a timing diagram of a signal to be transmitted over frequency bands allocated in accordance with an embodiment of the invention.

Reference is made to FIG. 3, which schematically illustrates a timing diagram of a signal (e.g., an OFDM Access (OFDMA) signal) to be transmitted over frequency bands allocated in accordance with an embodiment of the invention. The signals depicted by the timing diagram of FIG. 3 may be, for example, signals transmitted by a mobile station, e.g., mobile station 110 or 120 of FIG. 1. The horizontal axis 301 in FIG. 3 may represent time. In one embodiment, the vertical axis 302 may represent, for example, bin clusters; in other embodiments the vertical axis 302 may represent, for example, frequency, frequency bins, frequency ranges, or frequency bands.

In the diagram of FIG. 3, the shaded large rectangles 311-315 represent time/frequency transmission slots for transmitting data blocks, and the small black rectangles (e.g., rectangles 351-354) represent time/frequency transmission slots for transmitting pilot signals.

As shown in the diagram of FIG. 3, a set of pilot signals may be transmitted by the mobile station periodically, e.g., at times t0, t1, t2, t3, t4, t5, t6, and t7. The set of pilot signals may be transmitted by the mobile station over multiple frequency slots, multiple frequency bins, or multiple bin clusters, e.g., over substantially the entire spectrum of frequencies available to the mobile station, or at which the mobile station is able to transmit, such that the servicing station may estimate the CQVs based on the set of pilot signals. In some embodiments, transmission of pilot signals may require different time and/or frequency resource allocation, e.g., relative to data allocation.

As further shown in the diagram of FIG. 3, data blocks 311-315 may be transmitted by the mobile station using multiple frequency slots, frequency bins or bin clusters. For example, data block 311 may be transmitted by the mobile station from time t0 to time t1' using bin cluster 4; data block 312 may be transmitted by the mobile station from time t1' to time t3' using bin cluster 3; data block 313 may be transmitted by the mobile station from time t3' to time t5 using bin cluster 5; data block 314 may be transmitted by the mobile station from time t5 to time t6' using bin cluster 1; and data block 315 may be transmitted by the mobile station from time t6' to time t7' using bin cluster 6. The mobile station may change the frequency of the uplink transmission, e.g., from bin cluster 4 to bin cluster 3, in response to an indication of the allocated bin cluster allocated to the mobile station by the servicing station.

Although FIG. 3 shows an OFDMA signal timing diagram, embodiments of the invention are not limited in this regard, and may include frequency allocation for other types of signals. For example, embodiments of the invention may be used in conjunction with Frequency Division Multiple Access (FDMA) signals, for example, such that the service station may estimate channel response at multiple frequency slots (e.g., frequencies and/or frequency slots outside a specified frequency band at which the mobile station transmits data blocks) and may allocate to the mobile station a frequency, a frequency bin or a bin cluster for uplink transmission, e.g., to increase or maximize throughput.

In some embodiments, the pilot signals of several users may be multiplexed, for example, to reduce the overall system overhead In such case, for example, multiple mobile stations may use the same frequency and time resources to transmit their pilot signals. For example, different patterns of symbols may be used for the different mobile stations that share the same time-frequency resources for transmitting their pilot symbols. At the servicing station, a multi-user detector (e.g., multi-user detector 155 of FIG. 1) may be used to decompose or demultiplex the overall signal into its contributions from the different mobile stations, while estimating their channel coefficients. In one embodiment, orthogonal symbol patterns may be selected to establish different pilot symbol sequences for different mobile stations.

For example, in one embodiment, a system may include two mobile stations, a single frequency bin, and two symbols (e.g., using a pilot signal spread over two time slots). The first mobile station may use a pilot sequence represented as $P_i^{(k)}$, where i represents a time slot index and k represents a user or mobile station index. The first mobile station, e.g., when k is equal to 1, may use two pilot symbols represented by $P_1^{(1)}=1$ and $P_2^{(1)}=1$ at time slots 1 and 2, respectively. The second mobile station, e.g., when k is equal to 2, may use two pilot symbols represented by $P_1^{(2)}=1$ and $P_2^{(2)}=-1$ at time slots 1 and 2, respectively. The above two sequences are orthogonal.

Accordingly, the received signal at the servicing station may be represented as $y_1=P_1^{(1)} \cdot h^{(1)} + P_1^{(2)} \cdot h^{(2)} + n_1$ and $y_2 = P_2^{(1)} \cdot h^{(1)} + P_2^{(2)} \cdot h^{(2)} + n_2$, for time slots 1 and 2, respectively; where $h^{(i)}$ represents channel frequency response of the i'th mobile station, wherein i may be 1 or 2; and $n_i$ represents the total noise component at the servicing station in the i'th time slot, wherein i may be 1 or 2. Since the pilot signals are orthogonal, it may be verified that the servicing channel may estimate the channel frequency response of the mobile station using the orthogonal property of the codes; for example, $\hat{h}^{(1)} = y_1 \cdot P_1^{(1)} + y_2 \cdot P_2^{(1)}$ and $\hat{h}^{(2)} = y_1 \cdot P_1^{(2)} + y_2 \cdot P_2^{(2)}$ for channel response from mobile stations 1 and 2, respectively.

In some embodiments, the mobile station may use non-orthogonal pilot sequences. In one embodiment, the servicing station may use a multi-user detector (e.g., multi-user detector 155 of FIG. 1) to jointly estimate channel frequency response values from substantially all (or a group of) mobile stations serviced by the servicing station, or in an area associated with or serviced by the servicing station.

In one embodiment, it may be possible to code the pilot symbols in the frequency domain. For example, a single pilot that originally required the use of a single frequency bin, may be replaced by a group of pilots that may be shared among multiple users using unique orthogonal code. In one embodiment, the set of frequency bins used to code the pilot may have similar frequency responses, and as a result may be detected at the servicing station.

In some embodiments, the wireless channels between different mobile stations in the system and their respective servicing station(s) may include time-varying, frequency-selective channels, e.g., according to a multi-path fading channel model. Multiple different uplink channels from mobile stations and their respective servicing station(s), and the fact that these channels may be frequency selective, may be utilized to "focus" the mobile station transmissions to time instances and frequency regions where their transmission may be more or most efficient, thereby reducing or minimizing the effects of power constraints and/or increasing or maximizing coverage, capacity and/or throughput. Some embodiments of the invention may be used, for example, with OFDM or OFDMA based systems, as well as with FDMA based systems.

Figure 4:
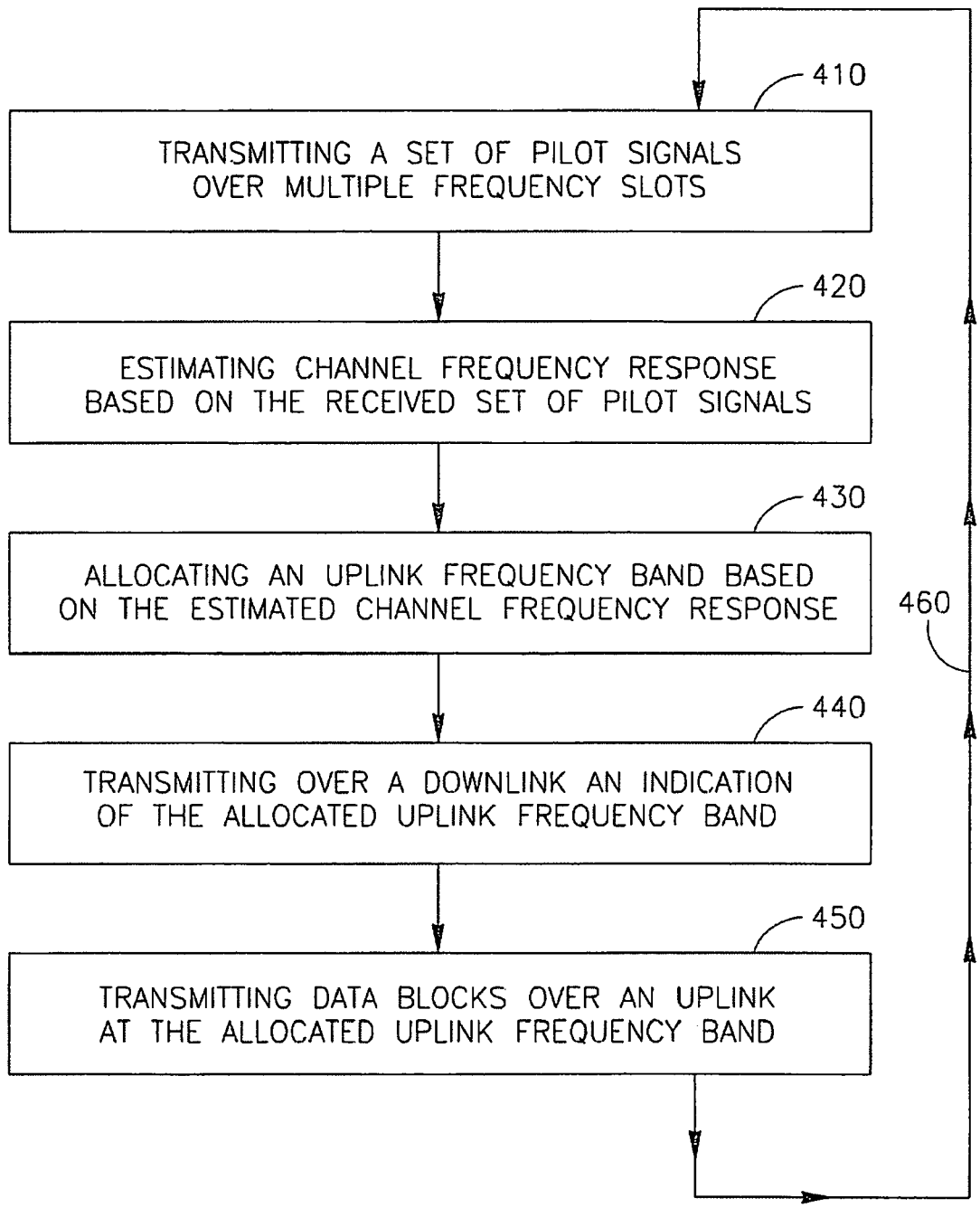
FIG. 4 is a schematic flow-chart of a method of frequency band allocation in accordance with an embodiment of the invention.

FIG. 4 is a schematic flow-chart of a method of frequency band allocation in accordance with an embodiment of the invention. Operations of the method may be implemented, for example, by system 100 of FIG. 1, by mobile station 110 of FIG. 1, by mobile station 120 of FIG. 1, by servicing station 130 of FIG. 1, and/or by other suitable stations, mobile stations, servicing stations, access points, controllers, modems, processors, transmitters, receivers, estimators, allocators, units, devices, and/or systems.

As indicated at box 410, the method may include, for example, transmitting a set of pilot signals periodically and over multiple frequency slots.

As indicated at box 420, the method may include, for example, estimating channel frequency response based on the received set of pilot signals. This may include, for example, estimating CQVs associated with the multiple frequency slots, respectively.

As indicated at box 430, the method may include, for example, selectively allocating an uplink frequency band, e.g., based on the estimated channel frequency response or CQVs. In one embodiment, for example, the allocation may include finding or selecting a non-allocated uplink frequency band associated with the highest estimated channel frequency response value and/or the highest CQV. In some embodiments, the allocation may optionally include storing data representing the allocated frequency band, for example, such that a consecutive allocation may take into account previously-allocated frequency bands and may selectively allocate only available (e.g., non-previously-allocated) frequency bands.

As indicated at box 440, the method may include, for example, transmitting (e.g., over a downlink) an indication of the allocated uplink frequency band.

As indicated at box 450, the method may include, for example, transmitting data blocks over an uplink at the allocated uplink frequency band.

As indicated by an arrow 460, the method may optionally include, for example, repeating some or all of the above operations, e.g., periodically or at pre-defined time intervals.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by mobile station 110, by mobile station 120, by servicing station 130, by processor 134, by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 135), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a multi-user detector to decompose a received signal into respective contributions from a plurality of mobile stations that share time and frequency resources for pilot transmissions, wherein said received signal comprises a plurality of patterns of pilot symbols corresponding to said plurality of mobile stations;
    an estimator to estimate channel quality values of a set of pilot signals received at different, respective, frequency slots of an uplink channel; and
    an allocator to allocate an uplink frequency band for said uplink channel based on said estimated channel quality values.

2. The apparatus of claim 1, wherein said allocator is to allocate an uplink frequency band corresponding to the highest of said channel quality values.

3. The apparatus of claim 1, wherein said channel quality values comprise Signal-to-Noise Ratio values associated with said multiple frequency slots, respectively.

4. The apparatus of claim 1, wherein said allocator is to selectively allocate a non-allocated uplink frequency hand associated with the highest of said channel quality values.

5. The apparatus of claim 1, comprising a transmitter to transmit an indication of the allocated uplink frequency band.

6. The apparatus of claim 1, further comprising:
    a receiver to receive said set of pilot signals.

7. The apparatus of claim 6, further comprising a plurality of receive antennas to receive said set of pilot signals at frequency slots of a plurality of respective uplink channels.

8. The apparatus of claim 6, wherein said receiver is to receive non-pilot data using a pilot signal frequency slot.

9. The apparatus of claim 1, wherein said allocator is to detect one or more mobile stations that are adapted to operate in accordance with a predetermined frequency allocation scheme.

10. The apparatus of claim 9, wherein said allocator is to detect said one or more adapted mobile stations based on an analysis of previous transmission properties of said one or more mobile stations.

11. The apparatus of claim 1, wherein said allocator is to handle a possible frequency allocation contention in accordance with a predefined contention avoidance scheme.

12. A method comprising:
    decomposing a received signal into respective contributions from a plurality of mobile stations that share time and frequency resources for pilot transmissions, wherein said received signal comprises a plurality of patterns of pilot symbols corresponding to said plurality of mobile stations;
    estimating channel quality values of a set of pilot signals received at different, respective, frequency slots of an uplink channel; and
    allocating an uplink frequency band for said uplink channel based on said estimated channel quality values.

13. The method of claim 12, wherein allocating comprises:
    allocating an uplink frequency band corresponding to the highest of said channel quality values.

14. The method of claim 12, wherein estimating channel quality values comprises:
    estimating Signal-to-Noise Ratio values associated with said multiple frequency slots, respectively.

15. The method of claim 12, wherein allocating comprises:
    selectively allocating a non-allocated uplink frequency band associated with the highest of said channel quality values.

16. The method of claim 12, further comprising:
    transmitting an indication of the allocated uplink frequency band.

17. The method of claim 12, further comprising:
    receiving said set of pilot signals.

18. The method of claim 17, wherein receiving comprises:
    receiving via a plurality of receive antennas said set of pilot signals at frequency slots of a plurality of respective uplink channels.

19. The method of claim 17, wherein receiving comprises:
    receiving non-pilot data using a pilot signal frequency slot.

20. The method of claim 12, further comprising:
    detecting one or more mobile stations that are adapted to operate in accordance with a predetermined frequency allocation scheme.

21. The method of claim 20, wherein detecting comprises:
    detecting said one or more adapted mobile stations based on an analysis of previous transmission properties of said one or more mobile stations.

22. The method of claim 12, comprising:
    handling a possible frequency allocation contention in accordance with a predefined contention avoidance scheme.

23. A wireless communication system comprising:
    a wireless communication station to transmit a set of pilot signals at different, respective frequency slots of an uplink channel; and
    a servicing station comprising:
        a multi-user detector to decompose a received signal into respective contributions from a plurality of mobile stations that share time and frequency resources for pilot transmissions, wherein said received signal comprises a plurality of patterns of pilot symbols corresponding to said plurality of mobile stations;

an estimator to estimate channel quality values of the set of pilot signals; and an allocator to allocate an uplink frequency band for said uplink channel based on said estimated channel quality values.

24. The wireless communication system of claim 23, wherein said allocator is to allocate an uplink frequency band corresponding to the highest of said channel quality values.

25. The wireless communication system of claim 23, wherein said channel quality values comprise Signal-to-Noise Ratio values associated with said multiple frequency slots, respectively.

26. The wireless communication system of claim 23, wherein said wireless communication station comprises a plurality of receive antennas to receive said set of pilot signals at frequency slots of a plurality of respective uplink channels.

* * * * *

UNITED STATES PATENT AND TRADEMARK OFFICE
CERTIFICATE OF CORRECTION

PATENT NO. : 7,574,214 B2  Page 1 of 1
APPLICATION NO. : 11/136476
DATED : August 11, 2009
INVENTOR(S) : Perets et al.

It is certified that error appears in the above-identified patent and that said Letters Patent is hereby corrected as shown below:

In column 11, line 56, in Claim 4, delete "hand" and insert -- band --, therefor.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,574,214 B2
APPLICATION NO. : 11/136476
DATED : August 11, 2009
INVENTOR(S) : Perets et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Seventh Day of September, 2010

David J. Kappos
*Director of the United States Patent and Trademark Office*